(12) United States Patent
Lan

(10) Patent No.: US 7,547,996 B2
(45) Date of Patent: Jun. 16, 2009

(54) POWER SUPPLY SYSTEM FOR COMPUTER

(75) Inventor: Ching-Chuan Lan, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 407 days.

(21) Appl. No.: 11/309,052

(22) Filed: Jun. 14, 2006

(65) Prior Publication Data

US 2007/0290662 A1    Dec. 20, 2007

(51) Int. Cl.
*G01R 1/20*    (2006.01)
*G06F 1/26*    (2006.01)
*G06F 1/00*    (2006.01)

(52) U.S. Cl. .................. 307/154; 713/300; 713/340

(58) Field of Classification Search ............ 713/300, 713/340; 307/149, 154
See application file for complete search history.

(56) References Cited

U.S. PATENT DOCUMENTS

| 5,008,829 A | 4/1991 | Cox et al. |
| 7,173,720 B2 * | 2/2007 | Nishizawa .............. 358/1.14 |

* cited by examiner

*Primary Examiner*—Shawn Riley
(74) *Attorney, Agent, or Firm*—Wei Te Chung

(57) ABSTRACT

A computer system includes a component, a power supply, and a direct current to direct current converter. The power supply provides a first direct current signal to the direct current to direct current converter. The direct current to direct current converter converts the first direct current signal into a second direct current signal, and provides the second direct current signal to the component.

6 Claims, 3 Drawing Sheets

POWER SUPPLY SYSTEM FOR COMPUTER

FIELD OF THE INVENTION

The present invention relates to a power supply system, more particularly to a power supply system for a computer.

DESCRIPTION OF RELATED ART

Nowadays, energy is so important, that greater efficiency of using energy is sought. Computers are in widespread use, and consume a great deal of energy. It is important to improve energy consumption of computers, especially for desktop computers.

Referring to FIG. 3, a conventional computer system has an internal power supply 80 which converts an AC (alternating current) signal (120VAC, 60 Hz, as commonly found in the United States) to appropriate DC (direct current) signals required for the operation of a microprocessor and associated components of the computer. The DC signals are provided to the motherboard 70. The DC signals are of different voltage levels, such as +12V, +5V, +3.3V, −12V and so on. Because there are so many different DC signals to be provided by the power supply 80, efficiency is low, and a great deal of energy is wasted. Furthermore, the wasted energy generates a lot of heat, which may damage the power supply and the computer system.

It is therefore desirable to find a new power supply system which can overcome the above mentioned problems.

SUMMARY OF INVENTION

A computer system includes a component, a power supply, and a direct current to direct current converter. The power supply provides a first direct current signal to the direct current to direct current converter. The direct current to direct current converter converts the first direct current signal into a second direct current signal, and provides the second direct current signal to the component.

Other advantages and novel features will be drawn from the following detailed description of preferred embodiments with attached drawings, in which:

DETAILED DESCRIPTION

Figure 1:
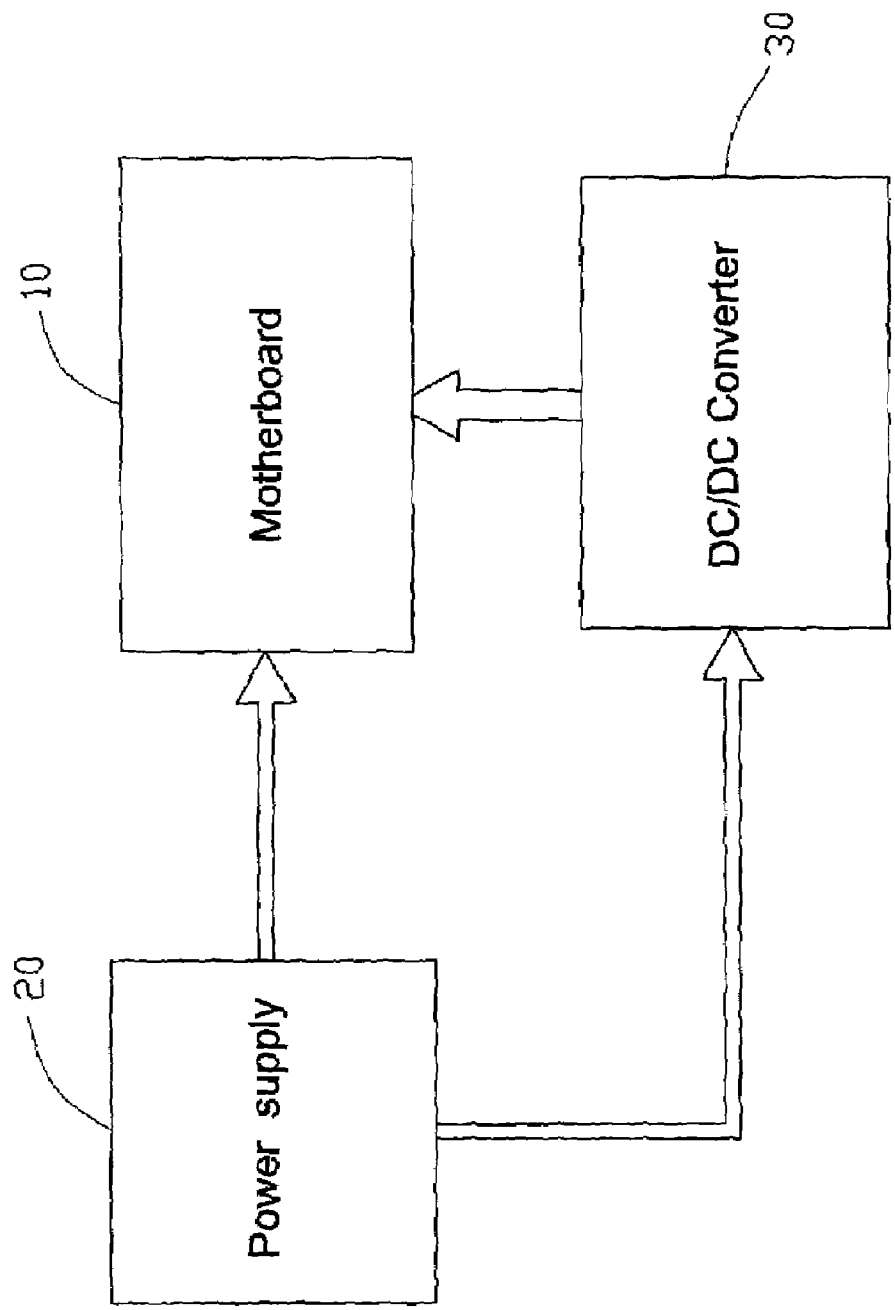
FIG. 1 is a circuit diagram of a computer system in accordance with a preferred embodiment of the present invention, including a power supply, a motherboard, and a DC/DC converter.

Referring to FIG. 1, a computer system in accordance with a preferred embodiment of the present invention includes a motherboard 10, a power supply 20, and a direct current to direct current (DC/DC) converter 30. The power supply 20 receives public alternating current (AC) signal, and converts the public AC signal into DC signals required for the operation of a microprocessor and associated components of the computer system, such as +12V, −12V DC signals. However, the power supply 20 doesn't convert and provide +5V and +3.3V DC signals. The power supply 20 provides these different DC signals to the motherboard 10 directly. The power supply 20 provides +12V DC signal to the DC/DC converter 30. The DC/DC converter 30 converts the +12V DC signal into +5V DC signal and +3.3V DC signal, and then provides the +5V and +3.3V DC signals to the motherboard 10 on which electronic components require +5V or +3.3V are installed. Thus it is not necessary for the power supply 20 to convert the public AC signal into +5V DC and +3.3V DC signals. The circuit in the power supply 20 is simpler than a conventional power supply and generates less heat. Because the DC/DC converter 30 has greater efficiency than the power supply 20 converting AC signal into DC signals, the efficiency of energy consumption is upgraded saving energy and producing less heat.

Figure 2:
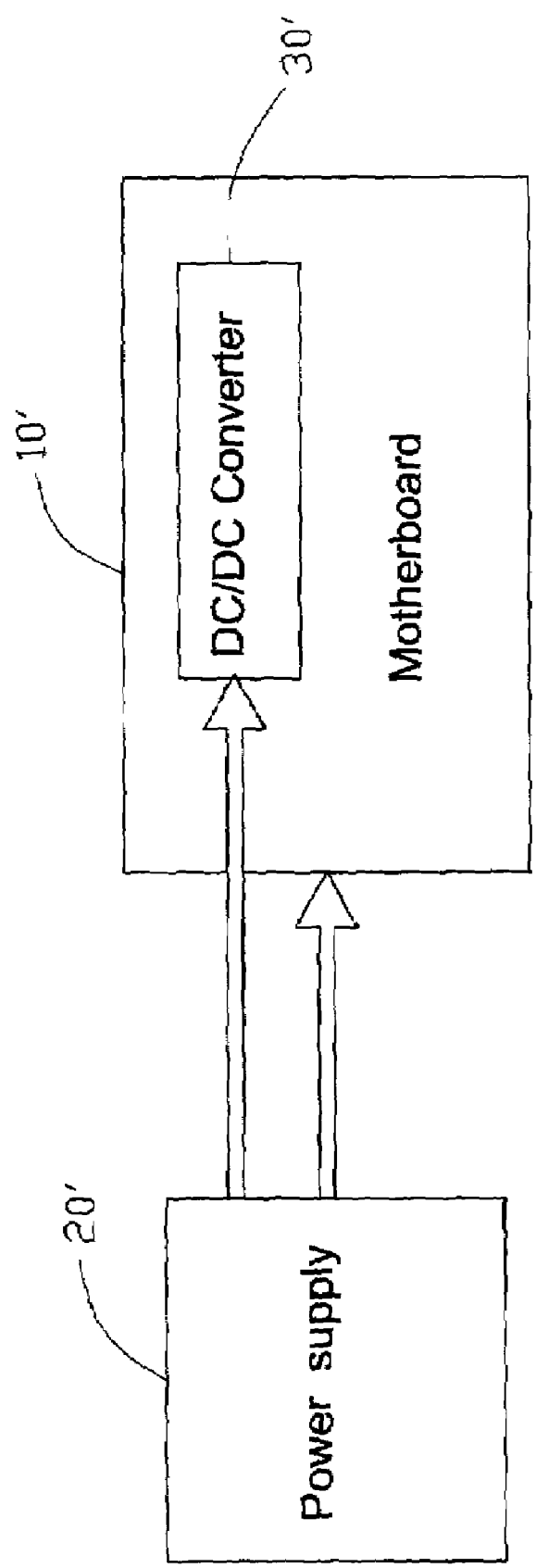
FIG. 2 is a circuit diagram of a computer system in accordance with another preferred embodiment of the present invention.
Figure 3:
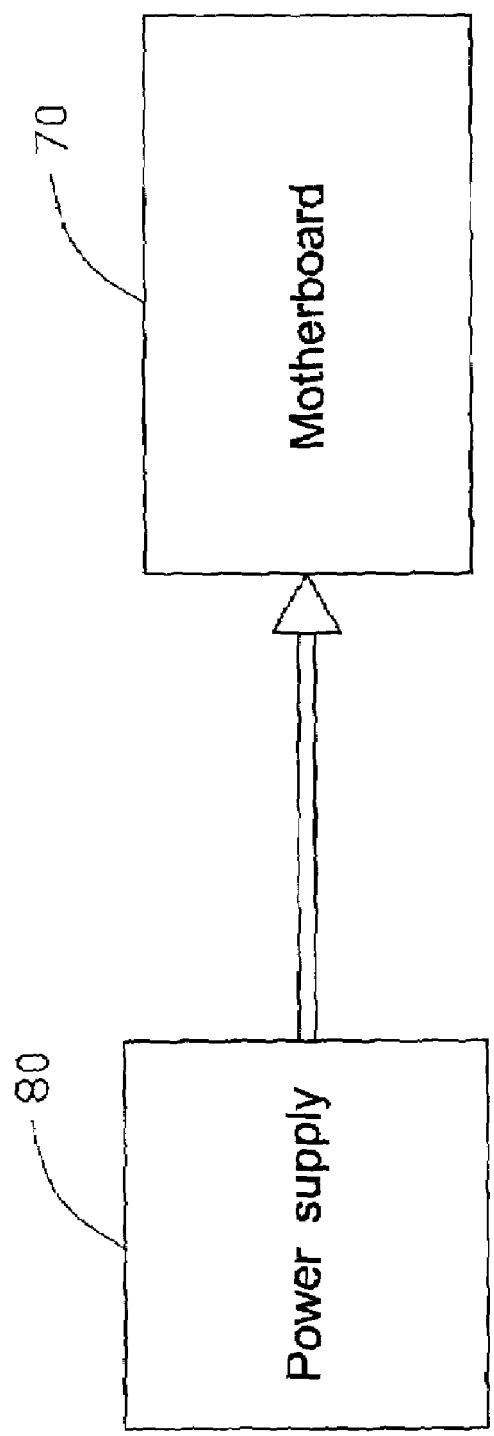
FIG. 3 is a conventional computer system including a power supply providing power source to a motherboard.

Referring to FIG. 2, another computer system includes a motherboard 10', a power supply 20', and a DC/DC converter 30' attached on the motherboard 10'. The power supply 20' converts public AC signal into DC signals required for the operation of the microprocessor and associated components of the computer system, such as +12V, −12V. The power supply 20' provides these different DC signals to the motherboard 10' directly. The power supply 20' provides +12V DC signal to the DC/DC converter 30'. The DC/DC converter 30' converts the +12V DC signal into +5V DC signal, and then provides the +5V DC signal to the motherboard 10'. Therefore it is unnecessary for the power supply 20' to convert the public AC signal into +5V DC signal.

As described above, the DC/DC converter 30, 30' can be set on the motherboard 10, 10', or be a separate component in a computer enclosure, or be in the power supply 20, 20'. The power supply 20, 20' also provides power to other components in the computer system, such as +3.3V DC signal for hard disk drives and optical disk drives. The +3.3V DC signal provided to these components can also be converted by the DC/DC converter 30, 30'.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer system comprising:
   a component;
   a power supply providing a first direct current signal, wherein the first direct current signal is +12V direct current; and
   a direct current to direct current converter provided with the first direct current signal from the power supply, the direct current to direct current converter converting the first direct current signal into a second direct current signal, and providing the second direct current signal to the component, wherein the second direct current signal is +5V or +3.3V direct current, the direct current to direct current converter is a separate component in a computer enclosure.

2. The computer system as described in claim 1, wherein the component is a motherboard, and the power supply also provides the first direct current signal to the motherboard directly.

3. The computer system as described in claim 2, wherein the power supply receives public alternating current signal, arid converts the public alternating current into the first direct current signal.

4. A computer system comprising:

electronic components one of which require a first direct current signal and another one of which requires a second direct current signal;

a power supply for receiving a public alternating current signal and converting the public alternating current signal into the first direct current signal; and a current convener for converting the first direct current signal transmitted from the power supply to the second direct current signal;

wherein the current converter is a separate component in a computer enclosure.

5. The computer system as described in claim 4, wherein the second direct current signal is lower than the first direct current.

6. The computer system as described in claim 4, wherein the current converter is capable of converting the first direct current signal to a third direct current signal, the first, second and third direct current signals having different voltages.

* * * * *